United States Patent [19]
Gueldenpfenning et al.

[11] 3,826,876
[45] July 30, 1974

[54] MESSAGE WAITING AND DO-NOT-DISTURB

[75] Inventors: Klaus Gueldenpfenning, Penfield; Uwe A. Pommerening; Stanley L. Russell, both of Webster, all of N.Y.

[73] Assignee: Stromberg-Carlson Corporation, Rochester, N.Y.

[22] Filed: Apr. 17, 1973

[21] Appl. No.: 351,885

[52] U.S. Cl. .............................................. 179/84 C
[51] Int. Cl. .............................................. H04m 3/42
[58] Field of Search .............................................. 179/84 C

[56] References Cited

UNITED STATES PATENTS 3,050,592 8/1962 Burgener ...................... 179/84 C X

*Primary Examiner*—William C. Cooper
*Attorney, Agent, or Firm*—Donald R. Antonelli; William F. Porter, Jr.

[57] ABSTRACT

A message waiting and do-not-disturb circuit for a PBX in which the line circuit designation automatically forwarded to the number display for each operator position when the operator connects to that line circuit is used to automatically access the one of a plurality of line unit stores associated with the line circuit to monitor the message waiting and do-not-disturb status of the line circuit and permit a changing of this status without need for special dialing.

14 Claims, 12 Drawing Figures

MESSAGE WAITING AND DO-NOT-DISTURB

The present invention relates in general to telephone systems, and more particularly to a message-waiting and do not disturb arrangement for use with a PBX telephone system.

For those telephone installations wherein a large number of telephone stations are controlled by an attendant, for example, the room telephones which are handled by a desk clerk at a motel or hotel switchboard or the telephones which are handled by a receptionist at an office switchboard, it is advantageous to provide a means for informing the individuals at each telephone station when a message is waiting for them at the switchboard and to provide an indication at the switchboard of those stations which do not desire to be disturbed by the receipt of calls. As a result, message-waiting and do not disturb arrangements have been provided in various forms for use with private branch exchanges.

In one typical message-waiting arrangement, when the switchboard attendant wishes to inform an individual that a call or message is waiting for him, the attendant dials the individual's line number and then depresses a "message-waiting" key mounted on the attendant's turret. A lamp mounted on the individual's telephone instrument will then flash on and off at a prescribed frequency indicating that a message is waiting. In other systems, a special digit must be dialed along with the individual's line number before a message-waiting condition can be initiated or removed. Such systems may also provide a do not disturb function operated in a similar manner by the attendant depressing a "do not disturb" key prior to dialing the individual's line number. Again, other systems require the dialing of a special digit prior to the dialing of the individual's line number. If in-coming calls are directed to a line which is in the do not disturb mode, a busy signal is returned or a recorded message arrangement activated to the calling part, whether it be another line located within the system or the switchboard attendant. Normally, a lamp is also provided at the switchboard which will be energized if the attendant attempts to call a line which has been placed in the do not disturb mode indicating to the attendant the desire not to be disturbed on the part of the individual associated with the particular line circuit.

Because of the sequence of dialing operations which have been required by prior message-waiting and do not disturb arrangements, these systems have been somewhat inconvenient. For example, if an individual contacts the attendant with a request that he not be disturbed by in-coming calls, in order to initiate the do not disturb mode of operation, the operator must in many cases release from the connection, dial a special digit or depress a "do not disturb" key to obtain access to special storage circuitry and then dial the number of the line circuit once again.

Similar difficulties are encountered with initiation of the message-waiting condition with known systems. If the operator does not obtain an answer when ringing a line circuit and therefore wishes to initiate a message-waiting condition, it is necessary in many prior systems to first release from the connection and then dial a special digit or activate a "message-waiting" key to obtain access to special storage equipment and then dial the number of the line circuit once again. As is apparent, this need for repeated dialing of subscriber numbers in order to initiate the message-waiting and do not disturb features is inconvenient and time-consuming, especially at particularly busy operating times.

Accordingly, it is an object of the present invention to provide a telephone system including a message-waiting and do not disturb feature which enables the operator or attendant at the switchboard to initiate these special features at any time she is connected to a line circuit, whether the connection was initiated by the party or the operator, without need for further dialing of the line circuit number.

It is another object of the present invention to provide a telephone system including a message-waiting and do not disturb feature wherein an indication of the status of these two features with respect to any line circuit is provided automatically at the operator console each time a connection is established between the operator and a line circuit, whether initiated by the party or the operator.

It is a further object of the present invention to provide a telephone system including a message-waiting and do not disturb feature which enables the operator to initiate either feature by merely gaining access to a particular line circuit, such as by ringing, even though actual communication with the party associated with that line circuit is not established.

It is still another object of the present invention to provide a telephone system including a message-waiting and do not disturb feature which is extremely simple in that it makes use of line circuit identification data already provided in the system for other purposes to provide access to the appropriate storage areas containing the information concerning the status of these features in connection with each of the line circuits of the system.

It is still another object of the present invention to provide a telephone system including a message-waiting and do not disturb feature wherein the status of a line circuit in connection with the do not disturb feature is automatically checked by the system prior to completion of any call to a line circuit from inside or outside of the system.

The present invention has been designed particularly for use in a private automatic branch exchange including a number display arrangement for the operator or attendant consoles of the type disclosed in co-pending application Ser. No. 103,466, filed Jan. 4, 1971, by Uwe A. Pommerening et al., and entitled "Automatic Number Identification in PBX"now abandoned. In the number display arrangement disclosed in this co-pending application, when a station in the automatic PBX calls the operator, the line number of the station is fed into a special store and remains there so long as the operator retains control or access to the call. The number is fed into a second special store whenever the operator is actually serving the call, and the second special store is used to drive the display device, such as an array of Nixie tubes or other such numerical indication arrangement. The present invention takes advantage of the presence in the special store in the number display of the line number of the station to which the attendant or operator is connected by utilizing this line number information from the number display to access a special storage arrangement in which the status of the message-waiting and do not disturb functions are stored in connection with each line circuit. In other words, since the line number of the station to which the operator is connected automatically appears in the special store in the number display whenever the operator becomes associated with a line circuit, this line number information can be utilized to automatically access the message-waiting and do not disturb storage arrangement to determine at the same time the special feature status of that particular line circuit.

By automatically connecting the operator to the message-waiting and do not disturb circuitry, each time she becomes associated with a line circuit within the system, it is possible not only to provide for a monitoring of these special features in connection with the particular line circuit, but is also possible for the operator at that time to alter the status of these special features in connection with the particular line circuit without need to dial special digits or effect a prescribed sequence of dialing of the line circuit number to obtain access to the storage portion of the equipment. Thus, in accordance with the present invention, at any time that the operator is associated with a line circuit, the status of the message-waiting and do not disturb features are automatically monitored for the operator's information and the status of these features may be altered at that time merely by depressing the appropriate buttons on the console associated with the respective features.

The present invention also provides for an automatic monitoring of the status of the do not disturb feature in connection with the establishment of calls to any line circuit within the system, whether initiated from within or from outside of the system. In this way, for calls to a line circuit which is in the do not disturb mode, busy tone can be returned to the calling party, the calling party may be connected to a recording indicating the do not disturb status of the called line circuit or the calling party may be automatically switched to the operator for purposes of leaving a message.

These and other objects, features, and advantages of the present invention will become more apparent from the following detailed description thereof, when taken in conjunction with the accompanying drawings, which illustrate one embodiment of the present invention, and wherein:

FIGS. 1–3, when combined in numerical order, provide a schematic block diagram of a private automatic branch exchange which may include the present invention;

Figure 8:
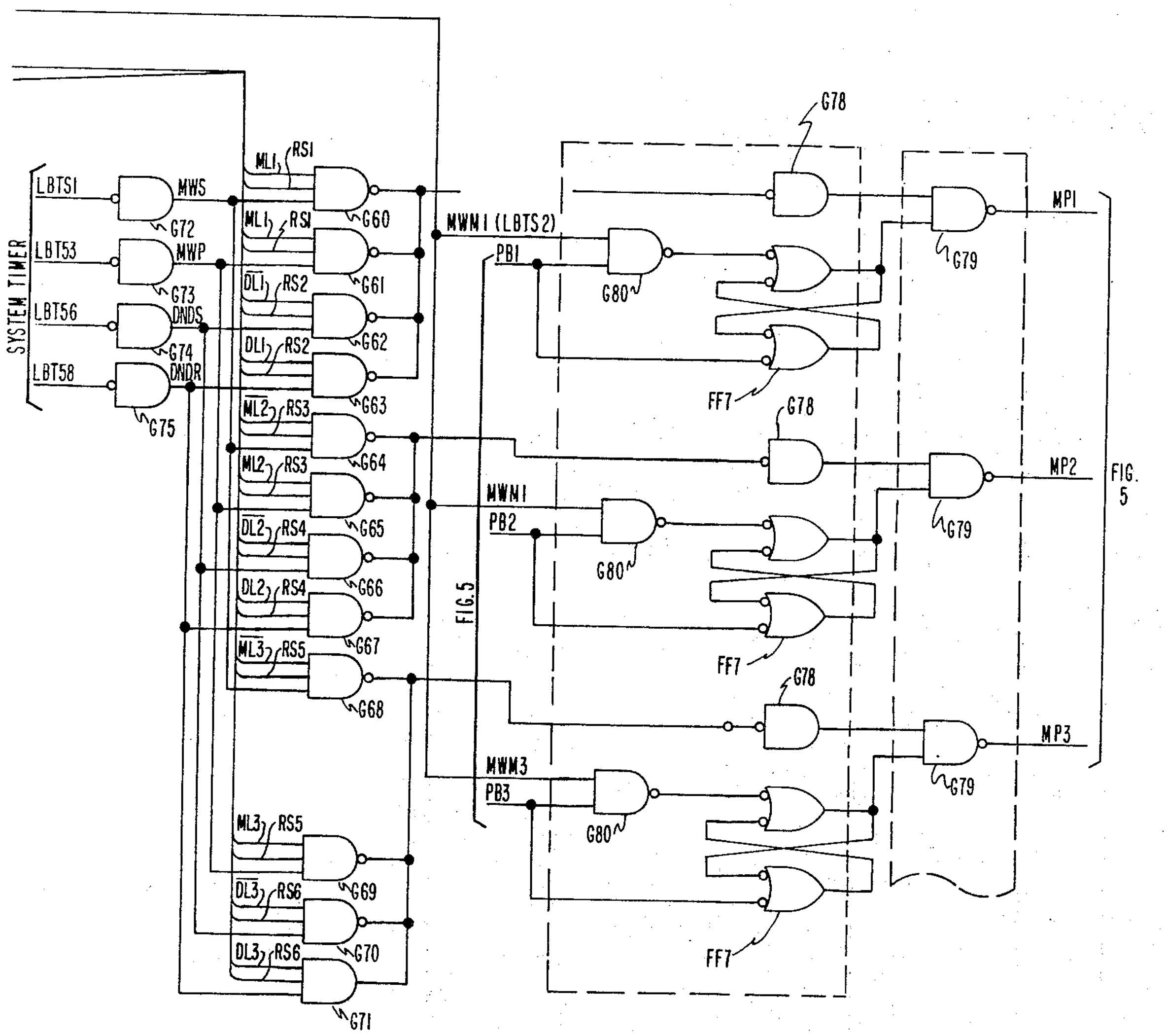
Figure 10:
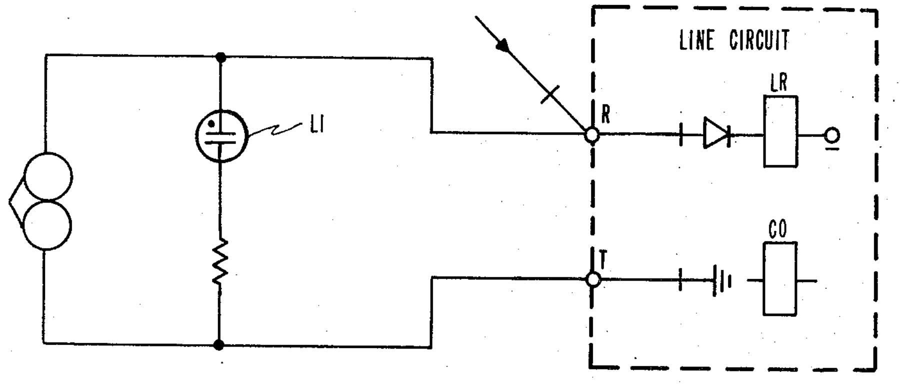
Figure 9:
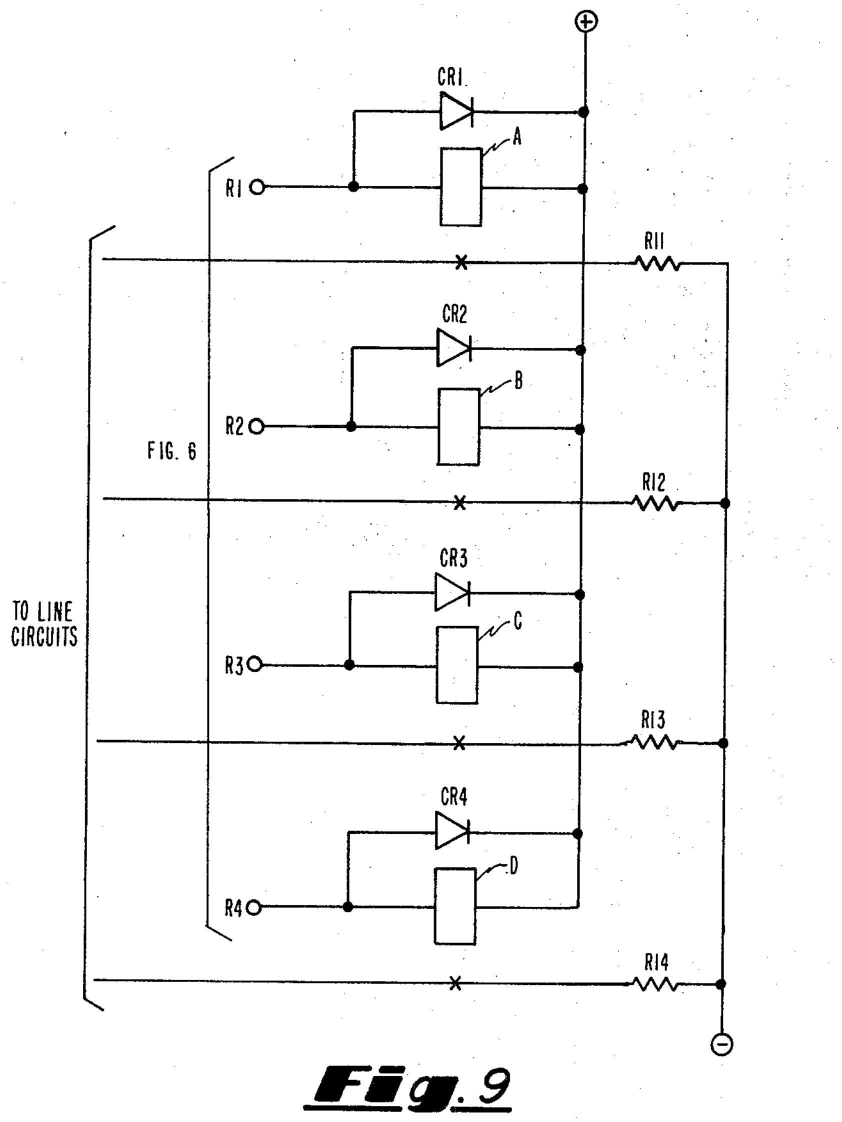
Figure 11:
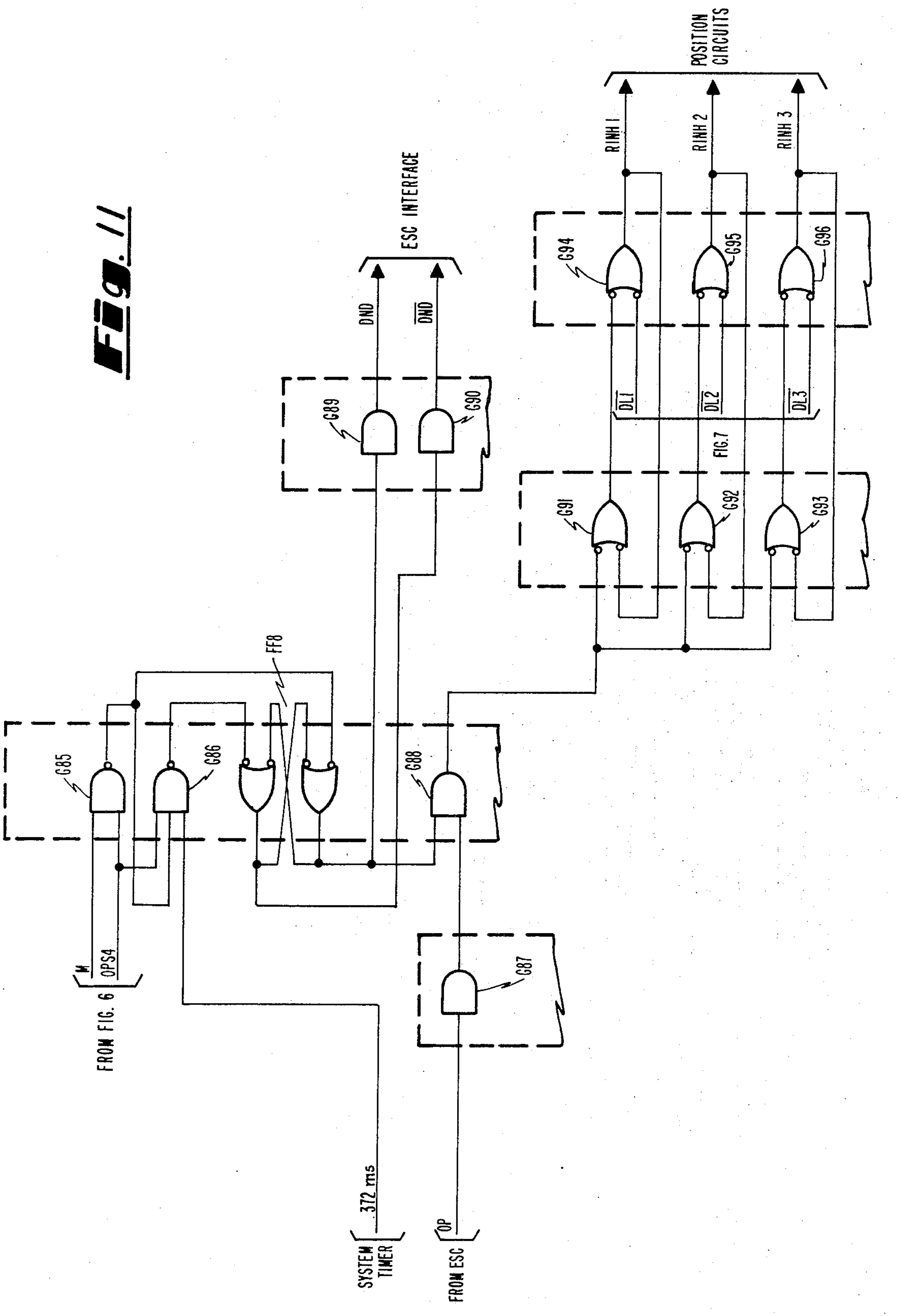

FIGS. *7a* and *7b* are schematic circuit diagrams of the position circuits and the portion of each operator console associated with the present invention;

FIG. 8 is a schematic circuit diagram of a second portion of the general control associated with the set and reset function;

FIG. 9 is a schematic circuit diagram of the operating circuit associated with the line units;

FIG. 10 is a schematic circuit diagram of a typical line circuit illustrating the manner in which the control signal for the present invention is connected thereto; and FIG. 11 is a schematic circuit diagram of a further portion of the general control relating to system monitoring and an inhibit function.

In order to facilitate an understanding of the various principles of the present invention, reference is made in the following disclosure to a typical private automatic branch exchange of the type to which the present invention is applicable. The details of the referenced PABX are set forth in copending application Ser. No. 293,518, filed Sept. 29, 1972, by Uwe A. Pommerening, Klaus Gueldenpfennig, and Stanely L. Russell, which is assigned to the same assignee as the present invention. However, it should be apparent from the following disclosure that the present invention is generally applicable to any private branch exchange wherein line number identification is automatically available at any time the operator obtains access to a line circuit.

GENERAL SYSTEM DESCRIPTION

Figure 1:
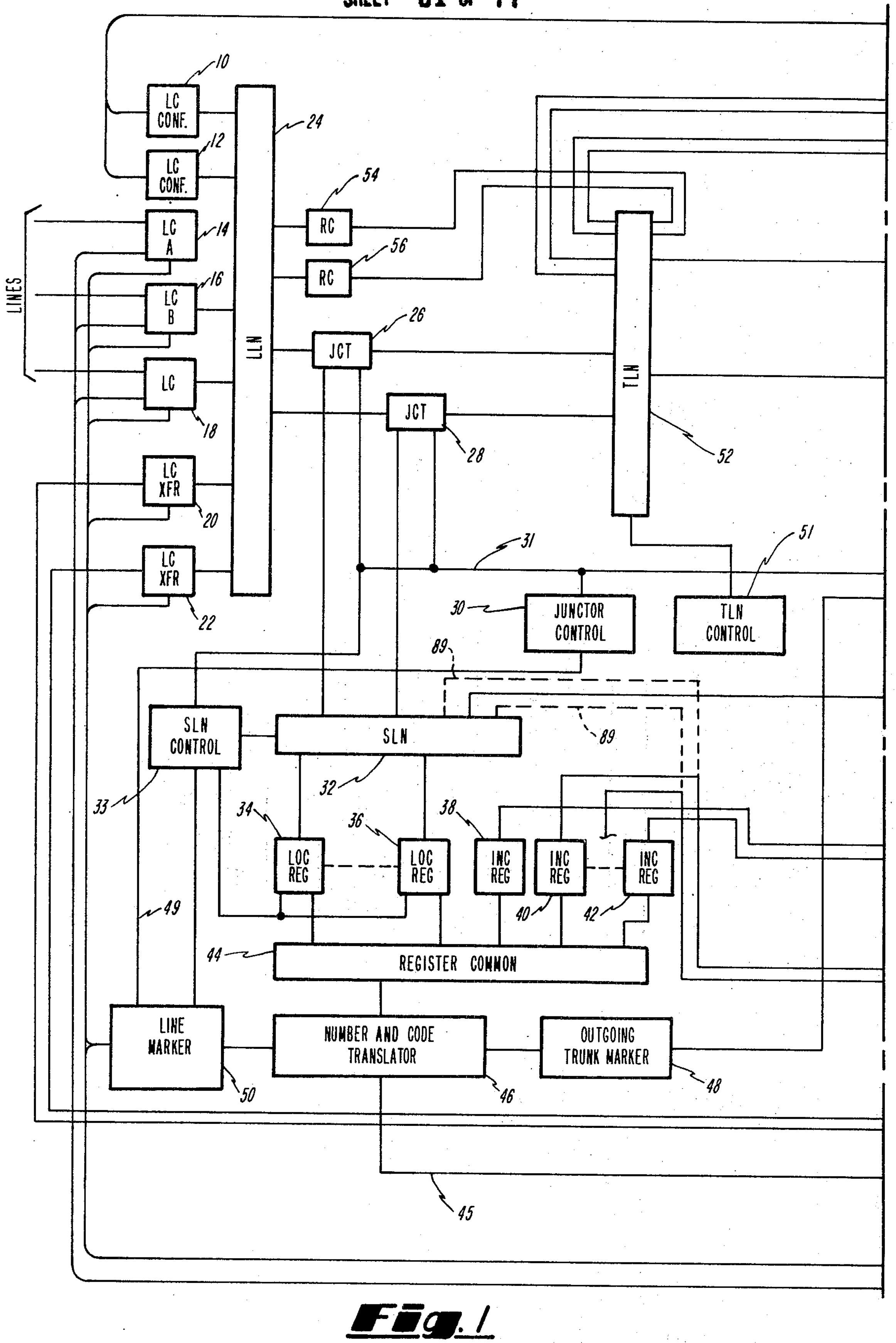
Figure 2:
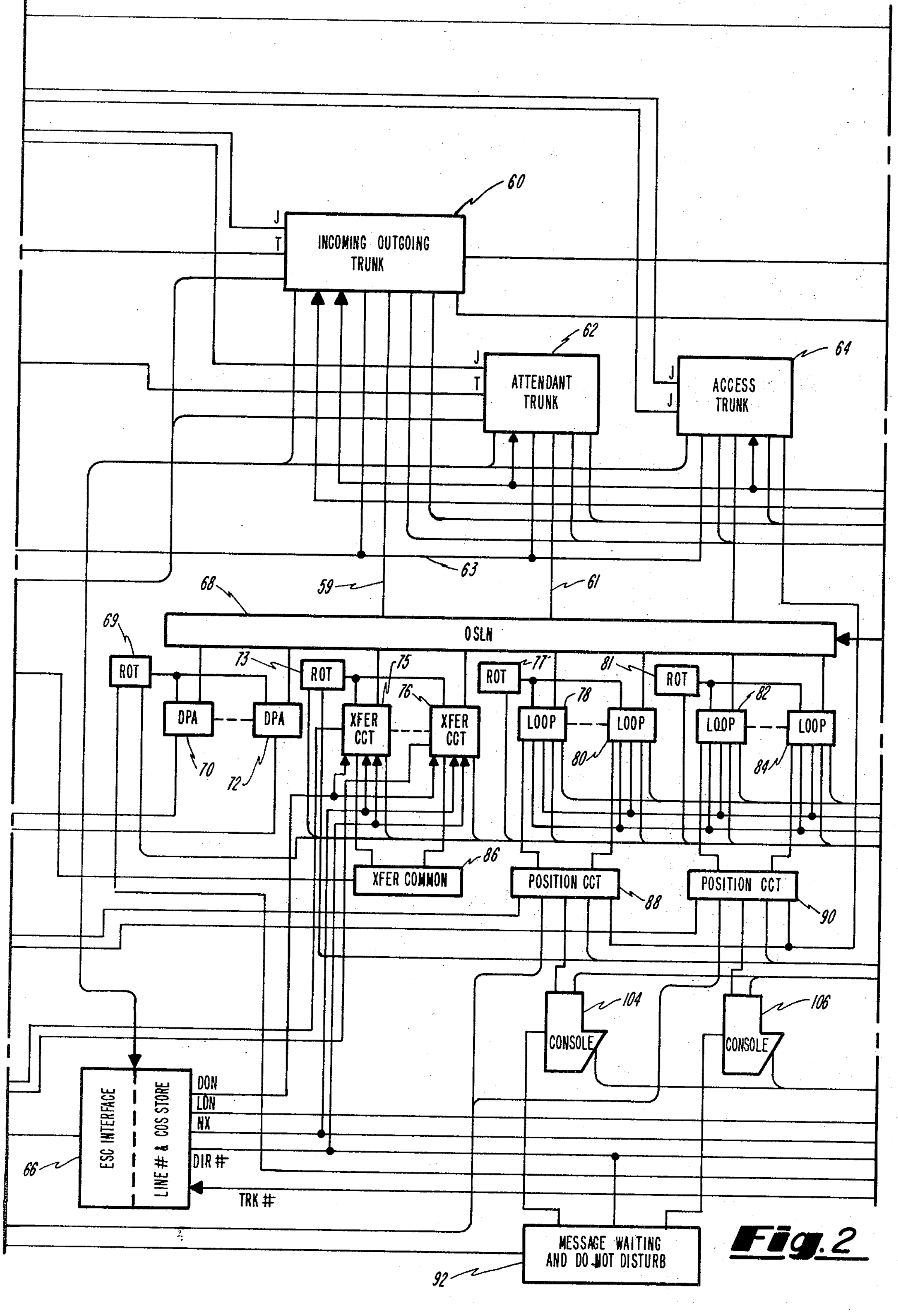
Figure 3:
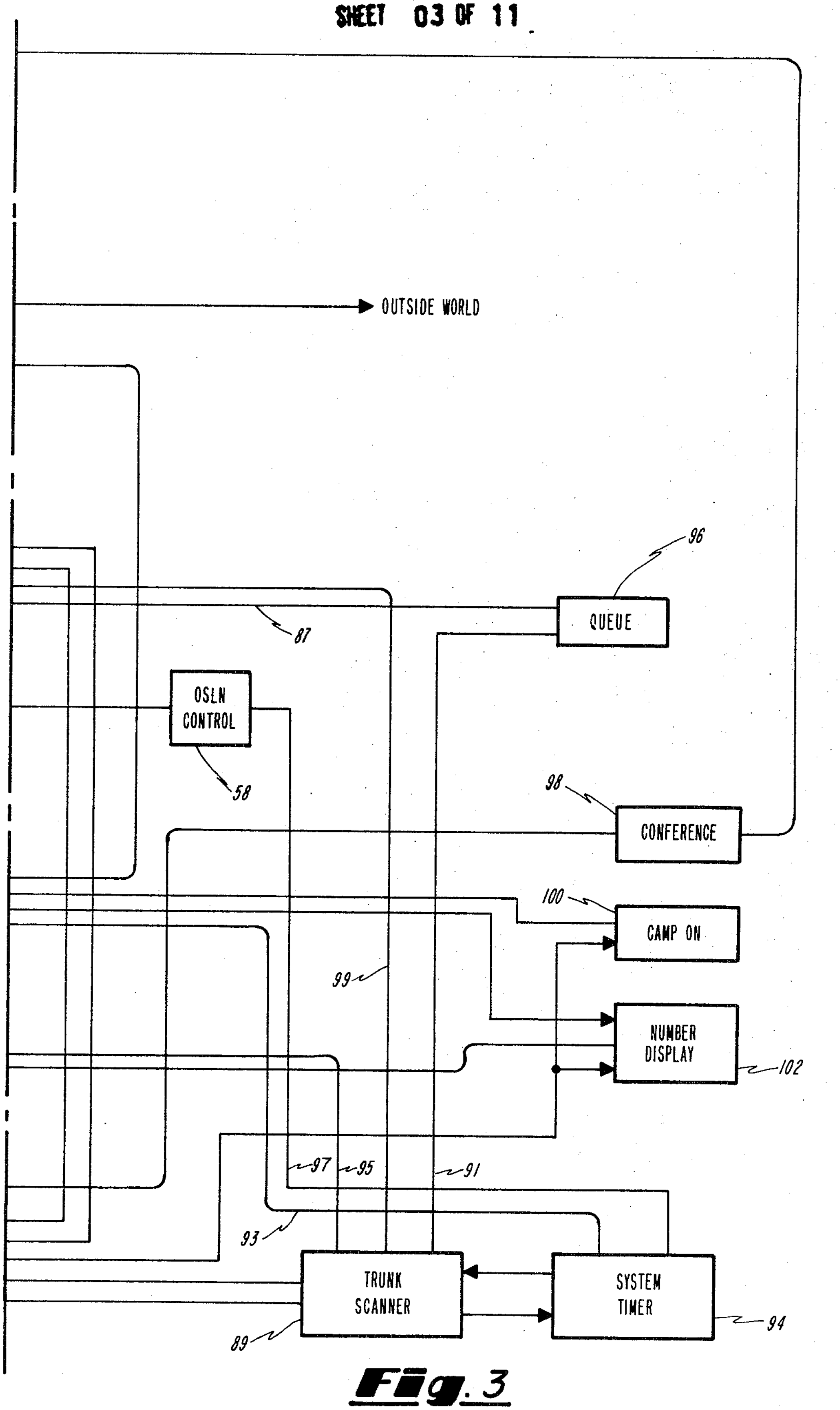

It will be seen from the drawings that FIG. 1 represents that portion of the system which relates to an electronic switching central; while, FIGS. 2 and 3 provide equipment which forms part of a private branch exchange.

Looking first to the portion of the system illustrated in FIG. 1, which provides the electronic switching center (ESC) equipment, there is included a line link network (LLN) 24 which functions as a concentrator for originating line calls and a fan out for terminating calls. The LLN consists of two stages of matrices, for example, and is used for both originating and terminating types of traffic. One end of the LLN is connected to a plurality of line circuits, such as the conference line circuits 10 and 12, typical subscriber line circuits 14, 16, 18 and transfer line circuits 20 and 22. The typical subscriber line circuits 14, 16, and 18 are more fully described in U.S. Pat. No. 3,708,627, issued Jan. 2, 1973, by Otto Altenburger, which is assigned to the same assignee as the present invention.

The line link network 24 provides one unique path between circuits connected to opposite ends of the network. Each of the switching networks in FIG. 1 includes matrix switches comprised of relays including a mark or control winding for initially actuating the relay and a hold or sleeve coil connected in series with its own contacts for maintaining the relay in the actuated state after a path through the network has been established. The last stage of the line link network 24 provides a termination for both originating traffic from the line circuits and incoming traffic to the line circuits. The terminating paths through the line link network to a line circuit are unique paths so that no path-finding need be performed between the ringing controls 54 and 56 and a line circuit through the line link network.

The terminations for the originating paths through the line link network are connected to one of a plurality of junctors, such as junctors 26 and 28. The ringing controls are more fully described in U.S. Pat. No. 3,671,678, issued on June 20, 1972, in the name of Otto Altenburger, which is assigned to the same assignee as the present invention. The junctor circuits 26 and 28 and the junctor control circuit 30 are more fully described in U.S. Pat. No. 3,705,268, issued Dec. 5, 1972, in the name of Otto Altenburger, which application is assigned to the same assignee as the present invention.

The junctors 26 and 28 serve as the focal points for all local originating traffic. The junctors include provisions for connecting the line circuits to the local registers 34 and 36 via a service link network (SLN) 32, and for providing transmission battery for calling and called parties on intraoffice calls. The junctors are under the control of the calling party. When trunk or station busy conditions are encountered, the junctors provide the busy tone to the calling party.

The service link network 32 includes two stages of matrices (P and S) and is controlled by a SLN control circuit 33 for connecting the calling line circuit via one of the junctors to one of a plurality of local registers. The local registers, when connected to the junctors, provide dial tone and include apparatus for acting on the subscriber instructions. The junctors terminate on the P stage and the dial pulse acceptors (not shown) in the local registers terminate at the S stage of the service link network. The local registers include dial pulse acceptors which provide the dial tone to the calling subscriber, detect rotary dial pulses and extend the pulses to storage sections in the local registers.

The local registers also comprise a register storage and register output and a sender for providing outpulsing. The registers and senders are controlled by a register common 44 which contains the necessary control units. The local registers are connected to the register common 44 on a time division multiplex basis wherein information is passed from one equipment to another on a common bus basis. The register common 44 is also connected to communicate with a number and code translator 46 on a time division multiplex basis. The translation circuit provides information such as equipment number, ringing codes and class of service. The number and code translator 46 is connected to the line scanner-marker circuit 50 which has the means to detect service requests and means to access the individual line circuits.

The ringing controls 54 and 56 connect ringing generators to terminating or called stations, detect off-hook conditions (ring-trip) of the called station, and provide ring-back tone for the calling station. Each line circuit can be connected to any of a plurality of ringing controls which are accessed from a trunk link network (TLN) 52 so that a ringing control is automatically connected to the terminating line circuit as soon as a connection to that line is complete.

A line scanner and marker circuit 50 continuously checks the line circuits for an off-hook condition and is used for both originating and terminating types of traffic. In the event of originating traffic, the line scanner stops when an off-hook condition is detected and transmits the information from its counter circuits to a marker circuit to mark the particular line circuit and enables the SLN control 33 to initiate a pathfinding operation between an available local register and the line circuit requesting service. In the event of terminating traffic, the line scanner is controlled by the number and code translator 46 so as to receive an equipment number from the translator to mark the line circuit with the particular equipment location. Furthermore, in terminating traffic, the line marker is also involved in transmitting the terminating subscriber classes of service, ringing code, busy or idel status, and types of ringing required throughout the junctor control 84 to the ringing control 34. The line scanner-marker circuit 50 is more fully described in U.S. Pat. No. 3,699,263, issued Oct. 24, 1972, in the names of Gunter Neumeier and Otto Altenburger, which is assigned to the same assignee as the present invention.

The trunk line network (TLN) 52 provides for the termination of the local traffic to local subscribers, the termination of incoming calls from other exchanges to the local subscribers, and for the connection of incoming calls from other exchanges to other external exchanges. The TLN 52 includes a three-stage network. When further expansion is necessary, another stage can also be included. A D stage of the matrix is the entrance to the TLN and is connected to the local junctors 26 and 28. An F stage is the output or exit of the TLN and is connected via the ringing controls to the line link network 24 and also the trunk circuits.

Path-finding through the trunk link network 52 is performed under the control of the TLN control 51 and the junctor control 30. The TLN control 51 and the junctor control 30 work together in completing the termination portion of a call, whether it is an internally terminated call or an outgoing call to a distant office. The number and code translator 46 and line scanner-marker 50 are used to complete calls to local lines, and the number-code translator together with the outgoing trunk marker 48 complete calls to the trunks. The outgoing trunk marker is more fully disclosed in application Ser. No. 103,267, filed Dec. 31, 1970, in the names of Otto Altenburger and David Stoddard, and is assigned to the same assignee as the present invention.

The path-finding scheme of the TLN control 51 includes a two-step scan. The junctor has been previously marked, and furthermore, the information in the local registers is transmitted via the register common 44 to the number-code translator 46 at this time. In the event of a call terminating to a local subscriber, the number-code translator via the line scanner-marker circuit marks the line circuit of the terminating call. In the event of an outgoing call, the number-code translator via the outgoing trunk marker circuit marks the particular trunk circuit. The path-finding sequences through the SLN and the TLN along with the equipment associated therewith are more fully described in copending U.S. application Ser. No. 153,221, filed on June 15, 1971, in the names of Otto Altenburger and Robert Bansemir, which application is assigned to the same assignee as the present invention.

Looking now to the portion of the system illustrated in FIGS. 2 and 3, which includes the (PBX) private branch exchange portion, five types of trunk circuits may be provided in the telephone system; however, only an incoming/outgoing trunk 60 providing direct inward and direct outward dialing, an attendant trunk 62, and access trunk 64 are illustrated. The access trunks 64 are used solely by the operators to originate calls to the subscriber stations; while, the attendant trunks 62 are used by the local stations for access to the operator, from which they can be extended to another trunk or local station. The incoming/outgoing trunks 60 interface the telephone exchang with distant offices. Each of the incoming/outgoing trunks 60 and attendant trunks 62 have port appearances at both the originating and terminating ends of the trunk link network 52, while the access trunks 64 have two line port appearances only on the originating ends of the trunk link network. The outgoing trunk marker 48 is connected to each of the incoming/outgoing trunks 60 and attendant trunks 62 and serves to select a trunk circuit for a call originated by one of the local subscribers in response to the dialed digits as analyzed by the number and code translator 46.

An operator service link network (OSLN) 68 controlled by an OSLN control 58 is provided for connecting the trunks 60, 62, and 64 to various service circuits such as the dial pulse acceptors 72–74, transfer circuits 74–76, and loop circuits 78–84. The operation of the OSLN 68 and the OSLN control 58 and the method of signaling through the OSLN is fully described in two copending U.S. patent applications entitled "Path Finding System", Ser. No. 92,593, filed Nov. 25, 1970, in the names of Klaus Gueldenpfennig and Stanley L. Russell; and a U.S. Pat. No. 3,707,140, issued Dec. 26, 1972, entitled "Telephone Switching Network Signalling System", for Klaus Gueldenpfennig, Stanley L. Russell, and Uwe A. Pommerening, both of which applications are assigned to the same assignee as the present invention.

The loop circuits 78–84 are separated into two groups 78–80 and 82–84, the former being connected to an operator console 104 via a position circuit 88 and the latter being connected to another operator console 106 via a position circuit 90. The loop circuit groups 78–80 and 82–84 are associated with rotaries 77 and 81, respectively, which serve to preselect an available loop for connection to the associated position circuit in preparation for a request for connection from a trunk to the operator console via its associated position circuit through the OSLN 68.

The position circuits 88 and 90 are connected to the system timer forming part of the common control for the PBX portion of the system, and the position circuits also are directly connected to a dedicated incoming register, such as 40 and 42, associated with the register common 44 and number and code translator 46 in the ESC portion of the system. If it is not desired to avoid dedicating registers to any single piece of equipment as the foregoing manner, then alternatively the position circuits 88 and 90 can be connected to the local registers such as 34 and 36 through the SLN 32 as indicated in FIG. 1 by the dashed lines. The connection of any of the trunks to any of the service circuit groups is fully disclosed in our copending U.S. patent application, "Private Automatic Branch Exchange Circuit Complex", filed Sept. 29, 1972, under Ser. No. 293,750, and assigned to the assignee of the present invention. The operation of the position and loop circuits is fully disclosed in a copending application entitled "Operator Loop Complex", Ser. No. 293,752, filed Sept. 29, 1972, and assigned to the assignee of the present invention.

The incoming/outgoing trunk circuit 60 may also be connected through the OSLN to one of several dial pulse acceptors 72–74, which, although shown separately for convenience, form part of the dedicated incoming registers 38–40, respectively. The dial pulse acceptors 72–74 are also preselected by a rotary 69 for connection through the OSLN 68 to a trunk upon request for service and are accessed by the trunk scanner 89 via the rotary 69.

The incoming/outgoing trunks 60 may also be connected through the OSLN 68 to transfer circuits such as 75–76, which are connected, respectively, to a dedicated transfer line circuit 20–22 at the input of the line link network 24. The transfer circuits are also preselected by a rotary 73 in preparation for a request for connection through the OSLN 68 to a universal trunk 60. The transfer operation includes the use of a transfer common 86 which is connected to the transfer circuits 75 and 76 and has a dedicated input to the service link network 32 for obtaining access to a local register 34–36. The transfer circuits and transfer common 86 are also connected to the system timer 94 and trunk scanner 89 via the rotary 73. The operation of the transfer circuit and transfer common is fully disclosed in a copending application entitled "Transfer Circuit", Ser. No. 293,681, filed Sept. 29, 1972, and assigned to the assignee of the present invention.

A queue 96 is provided in association with the universal trunks 60 and attendant trunks 62 to provide for servicing of requests for the operator on a first-come, first-served basis. The operation of the queue 96 is fully described in our U.S. Pat. No. 3,702,380 entitled "Queue for ELectronic Telephone Exchange", issued Nov. 7, 1972, which is assigned to the same assignee as the present application. The queue 96 is connected between each of the universal and attendant trunks and the trunk scanner 89 and serves to forward the trunk scanner 89 the request for operator signals as they appear at the output of the queue in conjunction with the scanning of the particular trunk by the trunk scanner 89. The trunk scanner 89 scans each of the incoming-/outgoing trunks 60, attendant trunks 62, and access trunks 64 in sequential order and is stopped in its scanning on a particular trunk upon receiving a request for service signal in connection with that trunk. The request for service signal may relate to a request for a loop circuit to access an operator, a request for a transfer circuit, or the request for a DPA in connection with a direct inward dialed call. If a requested service circuit is available when the request is received in the trunk scanner 89, a stop scan signal will be generated and the request for service signal will be forwarded to the service circuit.

The system timer 94 scans each of the operator position circuits and transfer circuits in sequential order simultaneously with the more rapid scanning of the dial pulse acceptors 70 and 72. The system timer 94 generates a plurality of time slot signals OPTS1-OPTSN, each of which, for example, may be of ten millisecond duration. Each of the operator position circuits, transfer circuits and various special circuits are assigned one of the operator time slots so that these circuits are scanned in the sequence in which the time slots are generated by the system timer. Time slot signals LBTS1–LBTS10 are also generated by the system timer for use in signaling and for timing the various operations to be performed during each operator time slot. Thus, each operator time slot OPTS is made up of ten time slots LBTS1–LBTS10. When a stop scan signal has been generated in the trunk scanner 89 and a request for service signal has been forwarded to the circuits of the type requested, the first circuit preselected by the rotary which is scanned by the system timer 94 will be seized and connection through the OSLN 68 from the trunk to the selected circuit will be effected.

The system may also provide for various special features circuits, including the message-waiting and do not disturb system 92 of the present invention, a conference system 98, and a camp-on system 100. The camp-on system is disclosed in our U.S. Pat. Nos. 3,676,606 and 3,679,835, both being assigned to the same assignee as the present invention.

As is quite well known, an electronic switching central of the type described in connection with FIG. 1 services requests from subscriber stations and connections from the outside world to subscribers within the system by common control equipment which functions on the basis of detected conditions; accordingly, in such a system, once a connection has been established from or to a subscriber station through the system, the common control equipment releases to leave only the communication connection. However, the PBX portion of the system and its various special features circuits require certain information concerning the communication connection, such as the calling and called line circuit directory numbers, the class of service of the various parties involved and the numbers of the trunks which may be involved in the call. This type of information is not retained by the ESC portion of the system once the connection through that portion of the system is completed and so the system provides a PBX-ESC interface and line number store 66 which receives information concerning the subscriber line circuits and the class of service of these circuits at the time the connection through the ESC is effected so that this information may be received and stored in the PBX portion of the system for further use in connection with the special service features. For example, each time a trunk is marked for connection ot a subscriber station, the data concerning the subscriber station, including the directory number and class of service thereof, will be forwarded via line 45 to the PBX-ESC interface and line number store 66 for storage therein or for transfer into the trunk circuit itself. For example, the transfer class of service will be forwarded to the trunk circuit upon connection thereof to the subscriber station by enabling of the NX data bus from the store 66 each time a connection to a trunk is effected.

In conjunction with the message-waiting and do-not-disturb function of the present invention, as performed by the circuit 92, the ESC will pause prior to completing a connection to any line circuit to request of the message-waiting and do-not-disturb circuit 92 whether that line circuit may be in a do-not-disturb status. In this regard, the directory number of the called line circuit is forward to the circuit 92 directly where it serves during a special monitor time slot to access the line unit store of the line circuit which provides the do-not-disturb status of that line. In any case, each time an operator is connected to a line circuit, the directory number thereof is forwarded from the PBX-ESC interface to the number display 102, thereby making it available in conjunction with the message-waiting and do-not-disturb operation, as will be described in greater detail hereinafter.

Signaling concerning dialed information from the number and code translator 46 and the PBX portion of the system is also effected through the PBX-ESC interface 66, such as signaling in connection with the dialing from the outside world of the listed directory number of the system by enabling the LDN lead or dialing by an inside subscriber of "0" on a transfer operation by enabling the DOX lead.

MESSAGE WAITING AND DO-NOT-DISTURB

Figure 4:
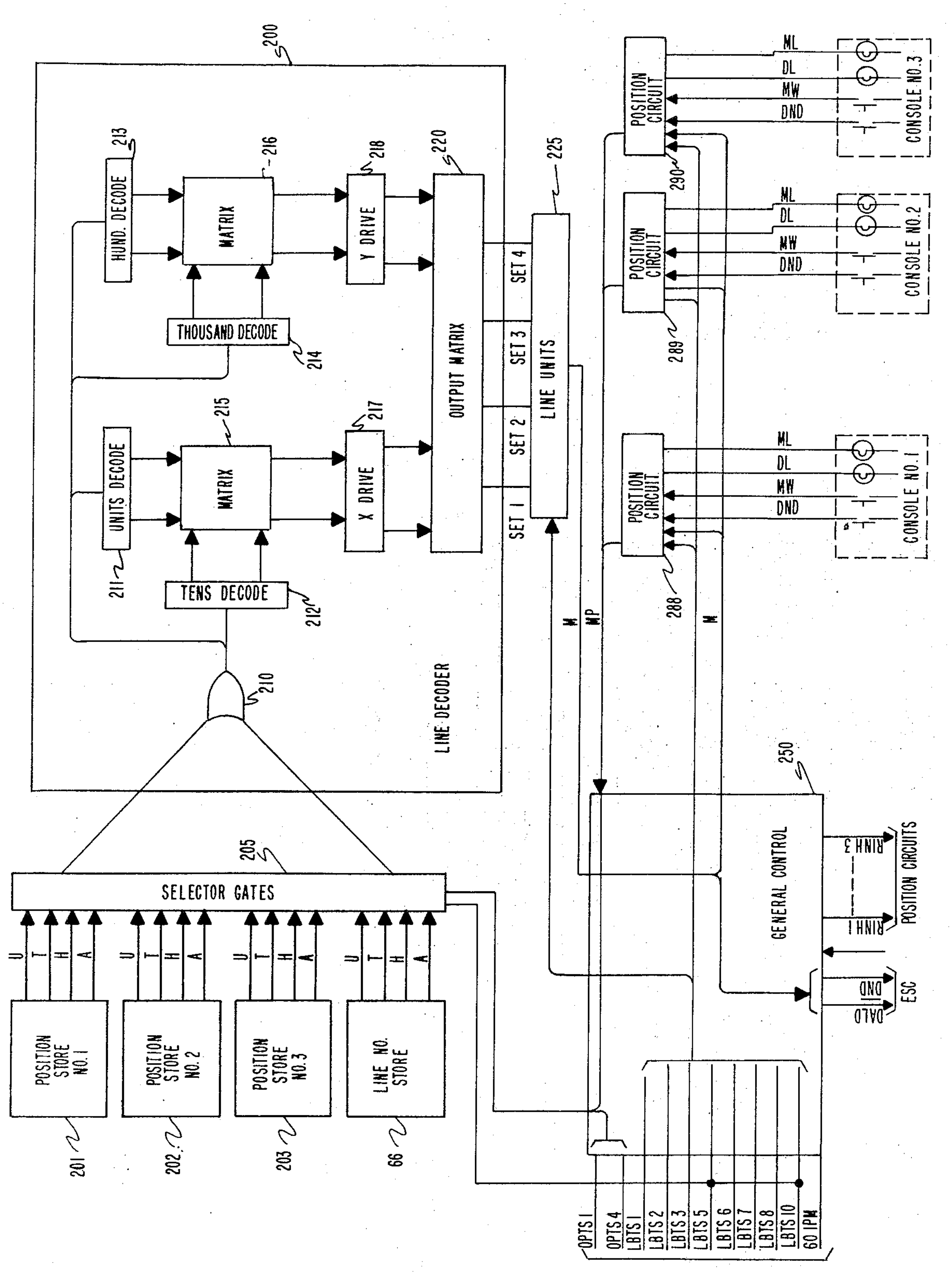
FIG. 4 is a schematic block diagram of the message-waiting and do-not-disturb arrangement in accordance with the present invention.

FIG. 4 is a schematic block diagram illustrating the details of the message waiting and do-not-disturb system 92 and the interconnections thereof with other circuits in the exchange, including portions of the operator consoles, operator position circuits, the position stores provided as part of the number display and the ESC-PBX interface and store.

As indicated in the copending application Ser. No. 103,466 filed Jan. 4, 1971, in the name of Uwe A. Pommerening, Klaus Gueldenpfennig, and Stanley L. Russell, entitled "Automatic Number Identification in PBX", the number display 102 includes a position store associated with each operator position circuit for storing the directory number of any line circuit associated with the particular operator position. Whenever the system interconnects an operator position circuit to a line circuit, whether initiated by the party at the line circuit or the operator, the line number of the line circuit is transferred from the ESC portion of the system through ESC-PBX interface 66. This line number is then transferred to a loop store associated with the number display 102, from which it is transferred to a position store associated with the particular operator position circuit. The line number stored in the position store is then decoded and the decoded output serves to operate a display on the operator console indicating the line number to which the operator is connected.

The present invention makes use of the fact that in the system described whenever the operator becomes associated with a line circuit, the line number of that line circuit will be immediately stored in the position store of the operator position circuit for purposes of number display. This is true even if the call from the operator is not answered or if busy tone is received indicating that the line is busy. So long as the operator position circuit is actuated in the line switching mode, the line number will appear in the position store associated with the operator position circuit for purposes of number display. It is the presence of the line circuit number in the position store of the operator position circuit which is used in accordance with the present invention to access individual line units which store the message waiting and do-not-disturb status information for each respective line circuit and permit the monitoring or changing of this information to control the message waiting and do-not-disturb functions. In FIG. 4, the position stores 201, 202, and 203 as well as the line number store portion of the ESC-PBX interface 66 have their units, tens, hundreds, and thousands outputs connected to a selector gate arrangement 205 so that the outputs of a single position store at a time are selectively gated to a line decoder 200. The outputs from a selected store are applied to an OR gate combination 210 which selectively applies the individual outputs to respective binary-to-decimal decoders 211, 212, 213, and 214, whose outputs are applied to respective matrices 215 and 216. The outputs of the matrices 215 and 216 are applied respectively to an X drive 217 and a Y drive 218, the outputs of which are connected to an output matrix 220. The matrix 220 provides an output on a single line representing the line circuit designated by the binary line number applied to the input of the line decoder 200.

A separate one of a plurality of line units 225 comprise an individual store for each of the line circuits in the system. Each line unit includes a pair of flip-flops which store the respective message waiting and do-not-disturb status of the particular line circuit and the outputs of the line decoder 200 from the output matrix 220 serve to enable the individual line units for monitoring and change of status of the conditions stored in the respective flip-flops of each line unit either for setting or resetting the message waiting and do-not-disturb conditions stored therein. The information stored in the individual line units is then processed by a general control 250 in accordance with the timing provided by the operator time slots OPTS and signaling time slots LBTS provided from the system timer 94 in combination with the access request signals provided by the individual position circuits 288, 289, and 290. In this regard, the system has been described in conjunction with only three operator position circuits in order to facilitate an understanding of the basic principles of the present invention; however, the number of operators provided in the system may obviously be increased by merely increasing the number of operator position circuits and position stores along with a consequence increase in the number of operator time slots provided in the time frame generated by the system timer.

Whenever an operator position circuit is connected to a loop, a signal MP is generated within the position circuit and forwarded to the general control 250. The signals MP are then ANDED with the appropriate control time slots OPS1–OPS3 from the system timer 94 to provide the signals which actuate the selector gates 205. Thus, the outputs from those position stores 201 – 203 associated with an operator position circuit which has been switched through to a line circuit will be sequentially gated through the selector gates 205 to the line decoder 200 in the sequence of the control time slots OPS1–OPS3. In this way, the line units 255 associated with line circuits which have been accessed by an operator will be sequentially enabled from the output of the line decoder 200 in the sequence of the operator position circuit as designated by the operator time slots.

The data derived from the line units 225 is applied to the operator position circuits 288, 289, and 290 where it is stored for use in selectively energizing the respective lamp indicators at the operator consoles provided for message waiting and do-not-disturb. The operator consoles are also provided with respective buttons to generate signals for setting and resetting the message waiting and do-not-disturb conditions stored in the individual line units. The signals generated upon depression of the respective buttons at the operator console are gated with the signaling time slots LBTS1–LBTS10 to provide for monitoring, setting, and resetting of the line units as required under the particular conditions.

As indicated in connection with the general system description, the operator time slots OPTS generated by the system timer 94 are made up of ten signaling time slots LBTS, the signaling time slots being utilized to control various functions which must be performed by the various special features circuits and other circuits in the system. In connection with message waiting and do-not-disturb, LBTS1 is provided for message waiting set, LBTS2 is provided for message waiting monitor, LBTS3 is provided for message waiting reset, LBTS5 is provided for ESC monitor, LBTS6 is provided for do-not-disturb set, LBTS7 is provided for do-not-disturb monitor, LBTS8 is provided for do-not-disturb reset, and LBTS10 is provided for ESC monitor. In the position circuits, when the operator depresses the message waiting button or do-not-disturb button, the signal generated thereby is compared to the present condition for message waiting or do-not-disturb as provided from the output of the line unit associated with the line circuit to which the operator is connected so that the signal which is generated upon depression of the particular button serves to change the status of the flip-flop in the line unit from set to reset or vice versa depending upon the previous condition. Thus, depending on the status of the respective flip-flops of the particular line unit, the appropriate signaling time slot LBTS1, LBTS3, LBTS6, or LBTS8 will be gated with the signal generated upon depression of the button at the operator console to control the change of stored data in the line unit.

The message waiting and do-not-disturb circuit of the present invention provides two distinct functions in the system. A monitoring function occurs each time an operator is switched through to a line circuit so that the appropriate indicator lamp on the operator console will indicate the present message waiting and do-not-disturb status of that line circuit. The second function permits the operator upon depression of the respective message waiting and do-not-disturb keys on the operator console to change the status of the line circuit with respect to the individual message waiting and do-not-disturb functions. As soon as the operator is connected to a loop, a signal MP is generated from the position circuit and gated with the appropriate operator time slot to enable the selector gates 205 to gate the line number information from the position store in the number display to the line decoder so that an output enabling the particular line unit associated with the line circuit is generated at the output of the line decoder 200. The line unit then provides the present status of the message waiting and do-not-disturb conditions of that line circuit to the position to selectively energize the appropriate lamp or lamps on the operator console indicating these conditions. In this regard, if the message waiting lamp is illuminated, then the line circuit is in a message waiting condition and/or if the do-not-disturb lamp is illuminated, then the line circuit is in a do-not-disturb condition. If the lamp is not illuminated at the operator console, this is an indication to the operator that that particular condition is not associated with the line circuit at that time. Thus, as soon as the operator is switched through to a line circuit, the indications of message waiting and do-not-disturb in connection with that line circuit are immediately visible at the operator console.

In connection with the do-not-disturb feature, it is imperative that the ESC portion of the system monitor the status of the line circuit at a time when a call is being switched through to the line circuit from other than the operator so that if the line circuit is in a do-not-disturb status, connection to the line circuit can be inhibited and other action can be taken in connection with that call. For example, if a party within the system or from the outside world attempts to establish connection with a line circuit which is in the do-not-disturb condition, the ESC will pause before completing connection to that line circuit and wait for receipt of the do-not-disturb status of the line circuit from the message waiting and do-not-disturb circuit 92 before completing the connection. As previously indicated, each time the system attempts to switch through to a line circuit, the line number of that line circuit is forwarded to the ESC-PBX interface 66 where the line number is stored for future use should the services of the PBX portion of the system be required. A particular control time slot, for example, OPS4, is used to gate the data in the line number store 66 through the selector gates 205 to the line decoder 200 so as to monitor the do-not-disturb condition of the line circuit as stored in its dedicated line unit. This data is then forwarded from the general control 250 as a signal DND or a signal $\overline{DND}$ indicating that the line circuit is in a do-not-disturb condition or is not in a do-not-disturb condition, respectively. If the line circuit is in a do-not-disturb condition, the system can then return busy tone to the calling party, connect the calling party to a recording indicating that the line circuit is in a do-not-disturb condition and/or connect the calling party to an operator so that the party may leave a message. When the ESC is accessing the message waiting and do-not-disturb circuit 92 to obtain information concerning the do-not-disturb condition of a line circuit, a signal OP is forwarded to the general control 250 which serves to generate a plurality of inhibit signals RINH1–RINH3 to inhibit the position circuits until the ESC has completed its inquiry.

Specific details of the line units 225, general control 250 and those portions of the position circuits associated with the message waiting and do-not-disturb function are illustrated in greater detail in FIGS. 5 through 11. Considering first the monitor function which is performed by the message waiting and do-not-disturb circuit 92, as soon as an operator is connected via a position circuit to a loop, a position busy signal PS BSY is generated and applied in FIG. 5 to respective gates G1, G2, and G3 providing outputs PB1, PB2, and PB3. The outputs from the respective gates G1–G3 are applied to gates G4, G5, and G6 along with the signaling time slots LBTS2 and LBTS7 provided from the system timer through gate G15, so that the signals PB1 – PB3 are gated through the gates G4–G6 only during the time slots LBTS2 and LBTS7, which are the monitor time slots. The outputs from the gates G4–G6 are applied as inputs MP1 – MP3 along with the respective operator time slots OPTS1–OPTS3 to respective gates G7–G9, the outputs from these gates being applied through gates G10–G12 to produce the selector gate operating signals OPS1–OPS3. During the signaling time slots LBTS5 and LBTS10, which represent the times for ESC monitoring, an output is provided from OR gate G16 through gates G17 and G18 to provide the selector gate operating signal OPS4.

The signals OPS1–OPS4 will be selectively generated in sequence if the operator position circuits with which they are associated have acquired access through a loop to a line circuit thereby gating the line circuit numbers from the respective position stores and the line number store of the ESC-PBX interface 66 to the line decoder 200. Thus, selected ones of the outputs SET1 – SET4 from the output matrix 220 in the line decoder 200 will be applied in sequential order as determined by the sequence of generation of the operator time slots to the respective line units 225.

Figure 6:
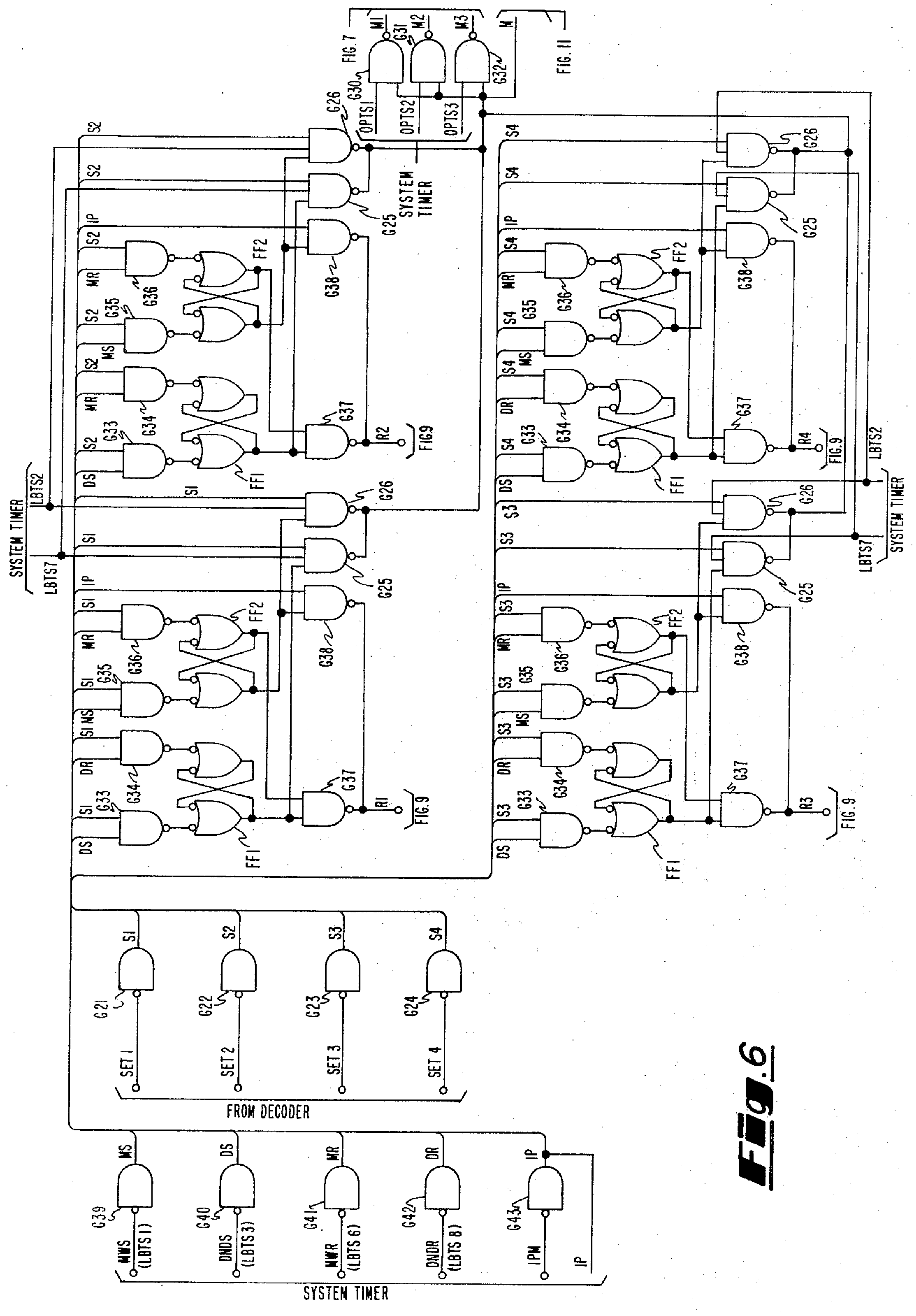
FIG. 6 is a schematic circuit diagram of the line units.

FIG. 6 illustrates four line units which are assigned to four of the line circuits in the system. Obviously, many more line units will normally be provided in the system, the number of line units always corresponding to the number of line circuits provided. Each line unit includes a pair of flip-flops FF1 and FF2 each flip-flop FF1 stores the do-not-disturb condition of the line circuit and each flip-flop FF2 stores the message waiting condition of the line circuit with which the line unit is associated. The output signal SET1 – SET4 from the output matrix 220 in the line decoder 200 are applied through gates G21 – G24 to each of the individual line units as respective signals S1 – S4. It should be noted at this point that only one signal at a time is generated from the output matrix 220 of the line decoder 200 since the data in the position stores and line number store 66 is gated to the line decoder 200 in sequential order corresponding to the generation of the control time slots OPS1 – OPS4. Thus, only one line unit at a time will be accessed and only those line units associated with a line circuit connected to an operator position circuit will be enabled.

In each line unit the pair of gates G25 and G26 are connected to the respective outputs of flip-flops FF1 and FF2 to monitor the state thereof. The gates G25 and G26 also receive the signaling time slots LBTS7 and LBTS2, respectively, as well as the enabling signals S1, S2, S3, or S4 depending upon the particular line unit. Thus, when a line unit is accessed for monitoring by generation of an access signal, such as S1 at the output of gate G21 for line unit 1, the do-not-disturb condition stored in the line unit will be read out during signaling time slot LBTS7 from the gate G25 and the message waiting condition stored in the line unit will be read out from the gate G26 during signaling time slot LBTS2. The outputs of the gates G25 and G26 are ORED together with the similar outputs from all the other line units and applied to a set of gates G30 – G32. It is possible to combine all of the outputs of the line units into a single output since the status of the line units is monitored individually in accordance with the operator time slots and the particular status of message waiting and do-not-disturb is monitored separately during the respective operator time slots in accordance with the signaling time slots LBTS2 and LBTS7. The gates G30 – G32 also receive at respective inputs the operator time slots OPTS1 – OPTS3 from the system timer 94 and provide at their outputs the information signals M1 – M3.

Figure 7A:
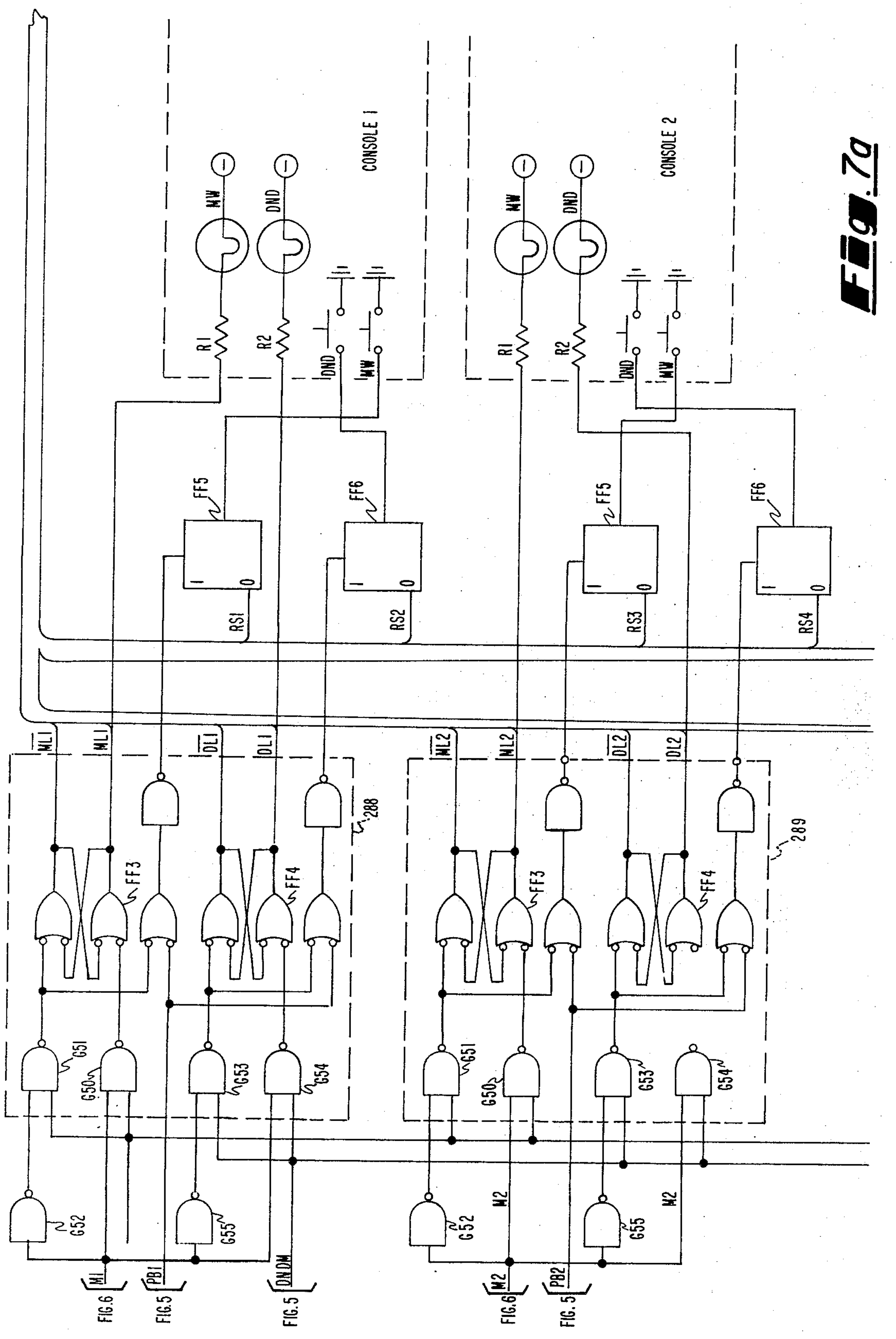
Figure 7B:
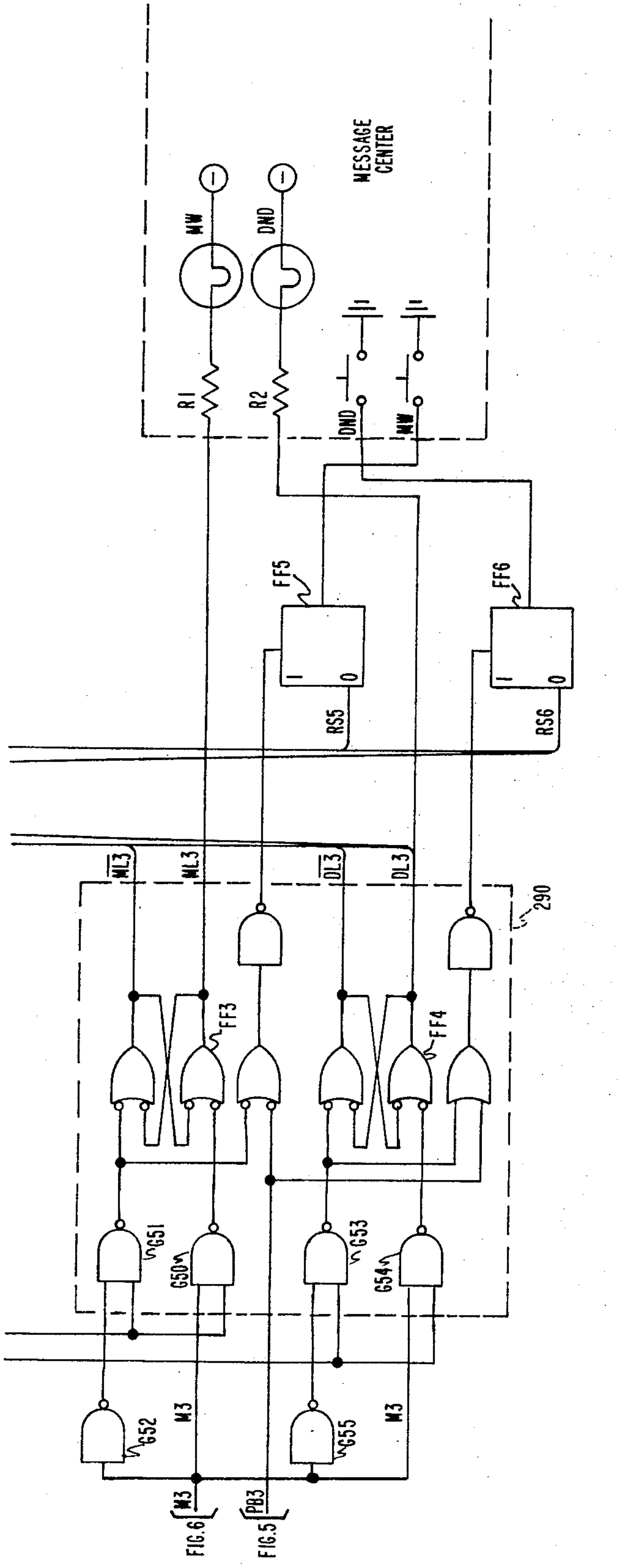

FIG. 7 illustrates a portion of the position circuits relating to the message waiting and do-not-disturb operation. Each position circuit includes a storage arrangement for storing the message waiting condition and do-not-disturb condition received from the respective line units in the form of a message waiting flip-flop FF3 and a do-not-disturb flip-flop FF4. The information signals M1 – M3 from the line units are applied to the respective position circuits along with the message waiting monitor signal MWM and do-not-disturb monitor signal DNDM is derived from the outputs of gates G19 and G20 in FIG. 5. It will be noted from FIG. 5 that these signals essentially correspond to the signaling time slots LBTS2 and LBTS7, respectively.

In FIG. 7, in connection with the position circuit 288, for example, if the signal M1 represents a message waiting condition as stored in the associated line unit, this signal will be applied through gate G50 upon receipt of the timing signal MWM to set the flip-flop FF3, thereby storing this condition in the flip-flop. To ensure setting of the flip-flop FF3, the signal M1 is inverted by gate G52 and applied through gate G51 in time with the signal MWM to the other side of the flip-flop FF3. In the same manner, if the line unit indicates a message waiting condition, the signal M1 will be applied through the gate G54 in time with the signal DNDM to set the flip-flop FF4. To ensure setting of the flip-flop FF4, the signal M1 will be inverted by gate G55 and applied through gate G53 in time with the signal DNDM to the other side of the flip-flop FF4. The set outputs from the flip-flop FF3 and FF4 from each position circuit provides ground through resistors R1 and R2 to the message waiting lamp MW and the do-not-disturb lamp DND, respectively, in the associated operator console. Obviously, if a message waiting condition or do-not-disturb condition is not provided from the output of the appropriate line unit, the signals M1 – M3 will not set the appropriate flip-flops FF3 and FF4 and the lamps connected thereto at the operator console will not be illuminated.

As is apparent from the above-described operation, as soon as an operator is associated with a line circuit through an operator position circuit and a loop, the selector gates 205 will be enabled in the proper operator time slot to enable the line unit associated with the line circuit through the line decoder 200 so as to gate out the information stored in the line unit concerning message waiting and do-not-disturb. This information is then stored in the position circuit in the respective flip-flops FF3 and FF4 thereof, the outputs of which then serve to selectively illuminate the lamps at the operator console to indicate to the operator the respective message waiting and do-not-disturb conditions of that line circuit.

The setting and resetting operations in conjunction with the individual line units are initiated in FIG. 7 when the operator depresses the respective message wait and do-not-disturb keys at the operator console. Each of the operator position circuits includes a respective flip-flop FF5 and FF6 connected to the message wait and do-not-disturb keys so that the flip-flops are set upon depression of these keys. Thus, the outputs from the flip-flops FF5 and FF6 indicate the desire to establish a setting of the corresponding flip-flops FF1 and FF2 in the individual line unit to establish a message waiting and/or do-not-disturb condition in connection with the unit line circuit.

FIG. 8 illustrates a portion of the general control 250 which determines whether a setting or resetting of the respective message waiting and do-not-disturb flip-flops in the individual line circuits are desired. The plurality of gates G60 through G71 are provided in groups of four to control the state of the flip-flops FF1 and FF2 in the line units by generating set or reset signals during the appropriate signaling time slots LBTS1, LBTS3, LBTS6, and LBTS8. For example, the gate G60 receives a signal $\overline{ML1}$ from the output of flip-flop FF3 in the position circuit 288 (FIG. 7) along with the signal RS1 at the output of flip-flop FF5 and the message wait set timing signal MWS from the output of gate G72. The three inputs to gate G60 indicate that the flip-flop FF1 in the first line unit is not set ($\overline{ML1}$) and the operator desires to establish a message waiting condition with respect to the line circuit (RS1) so that gate G60 will provide an output upon receipt of the signal MWS from gate G72 when the signaling time slot signal LBTS1 is generated. On the other hand, if the flip-flop FF1 in the line unit is already set indicating that a message waiting condition is already established with respect to the line circuit, a signal $\overline{ML1}$ will be received from the flip-flop FF3 in the position circuit 288 along with the signal RS1 from flip-flop FF5 associated with the console 1 to enable gate G61 when the output MWR from gate G73 is provided by generation of the signaling time slot LBTS3. Thus, during time slot LBTS3 an output will be provided from gate G61 directing a resetting of the flip-flop FF1 in the line unit. The gates G62 and G63 are operated in a similar manner upon generation of the signal RS2 from the flip-flop FF6 associated with the operator console 1 to provide outputs representing do-not-disturb set and do-not-disturb reset at the respective signaling time slots LBTS6 and LBTS8.

Figure 5:
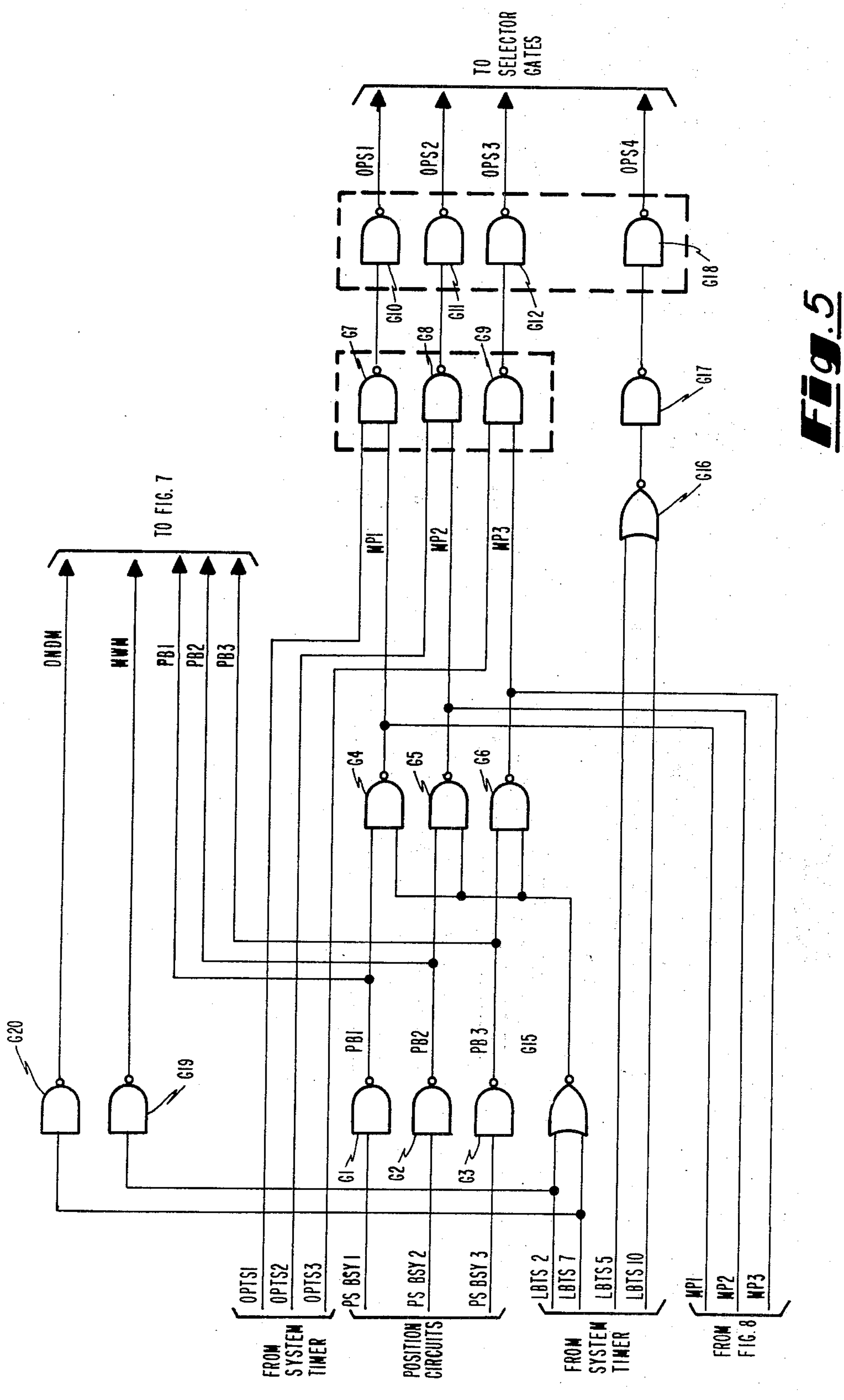
FIG. 5 is a schematic circuit diagram of a portion of the general control associated with the monitor function.

The outputs from each group of four gates, for example, gates G60 – G63 are provided in common to the input of a gate G79, which provides a respective MP signal, such as signals MP1 – MP3, to effect generation of the selector gate actuating signals OPTS1 – OPTS3 in FIG. 5 in the manner described previously.

In order to ensure that a monitor indication of the message waiting and do-not-disturb conditions for a particular line circuit are evidenced at the operator console before the operator is permitted to establish this condition or remove it, a flip-flop FF7 is provided in the circuitry illustrated in FIG. 8 to permit setting or resetting of the flip-flops FF1 and FF2 in the line units only after a monitoring of the information stored in the line units occurs. The position busy signals PB1 – PB3 from FIG. 5 are applied respectively to the gates G80 along with the message wait monitoring pulses MWM (LBTS2), the output of the gates G80 serving to reset the flip-flop FF7 associated therewith. As seen in FIG. 8, as soon as the position busy signal is generated by the operator being switched through to the line circuit, the flip-flop FF7 is set thereby inhibiting the gate G79 and preventing the monitor pulses MP1 – MP3 from being generated. As soon as the MWM monitor signal is generated at signaling time slot LBTS2, the gate G80 will reset the flip-flop FF7 thereby enabling gate G79 to generate the appropriate monitor pulse signal MP.

Referring once again to FIG. 6, for purposes of setting and resetting the flip-flops FF1 and FF2 in the individual line units, it will be noted from the foregoing description of FIG. 8 that the outputs from the output matrix 220 in the line decoder 200 will be generated only during generation of the appropriate signaling time slot LBTS1 for message waiting set, LBTS3 for do-not-disturb set, LBTS6 for message waiting reset, and LBTS8 for do-not-disturb reset as a result of gates G60 through G71 in FIG. 8. In each of the line units, gates G33 and G34 are connected to the set and reset sides of flip-flop FF1, and gates G35 and G36 are connected to the set and reset sides of flip-flop FF2. Gate G33 receives the signal S1 from the gate G21 and the signal DS from the gate G40 at signaling time slot LBTS3, while the gate G35 receives the signal S1 from the output of gate G21 as well as the signal DR from the output of gate G40 at time slot LBTS3. The gate G35 receives the signal S1 from the output of gate G21 and the signal MS from the output of gate G39, and the gate G36 receives the signal S1 from the output of gate G21 and the signal MR from the output of gate G41. In this way, the setting and resetting of the flip-flops FF1 and FF2 from the outputs of gates G33 – G36 are accomplished during the proper time slots. The outputs from gates G22 – G24 control the other line units in a similar manner.

The output from flip-flop FF1 on each line unit is applied through a gate G37 to a wired OR connection with the output of gate G38 which provides a forty impulse per minute signal to the terminal R1. The terminal R1 is connected to an associated one of the relays A – D, as seen in FIG. 9. The other side of each relay A – D is connected to a five volt source so that upon receiving ground from the line unit, the relay will be operated to close contacts from a 120 volt source to the line circuits. If the flip-flop FF1 in the line unit is set and the flip-flop FF2 is reset, a steady ground will be applied to the terminal R1 since the gate G38 will not be enabled. Under these conditions, the relay A will be operated continuously and the negative high voltage will be applied in a steady state to the particular line circuit. On the other hand, if the flip-flop FF2 is set and the flip-flop FF1 is reset or set, gate G38 will be enabled to override the output of the gate G37, if present, thereby causing the relay A to pulse at forty impulses per minute so that the negative high voltage will be applied to the line circuit in a pulsating manner.

As seen in FIG. 10, the negative high voltage is applied from the relay circuit of FIG. 9 to the ring lead so as to operate the indicator lamp L1 on the telephone set in a steady manner for do-not-disturb and a pulsating manner for a message waiting condition. Contacts of a CO relay in the line circuit are provided in the high voltage line from the message waiting and do-not-disturb circuit so as to remove the high voltage from the ring lead at any time that the subscriber is off-hook. However, as is apparent, the subscriber can go off-hook and on-hook repeatedly without actually changing the message waiting or do-not-disturb condition stored in the line unit.

In order to determine whether to complete connection of a call either within the system or from the outside world to a line circuit, the system must determine whetehr or not that line circuit is in a do-not-disturb condition. Thus, at each control time slot OPS4 the selector gates 205 will be enabled to gate data from the line number store 66 through the line decoder 200 to the line units 225, as seen in FIG. 4. If a line number is provided in the line number store 66 the do-not-disturb condition stored in the line unit associated with that line circuit will be applied to the input of a gate G85 in FIG. 11, which gate will be enabled on time slot OPS4 to set a flip-flop FF8. The condition of the flip-flop FF8 is reflected at the output of gates G89 and G90 as signals DND and DND. These information signals are then forwarded to the ESC portion of the system to inhibit the call if a do-not-disturb condition is indicated. At the same time, the ESC forwards a signal OP from the ESC-PBX interface 66 through a gate G87 in FIG. 11 to the input of a gate G88, which gate also receives at a second input the condition of the flip-flop FF8. If a do-not-disturb condition is stored in the flip-flop FF8, the gate G88 will be enabled providing an output to each of the gates G91 – G93. The outputs from the gates G91 – G93 are applied to an input of a corresponding gate G94 – G96 along with the position signals so that an inhibit signal RINH1 – RINH3 will be generated and forwarded to those position circuits which are associated with a line circuit. This serves to inhibit these position circuits to prevent setting or resetting operations by the operator during the time the ESC has control over the message waiting and do-not-disturb circuit. The flip-flop FF8 is continuously reset from the output of gate G86, which receives a reset timing signal from the system timer.

As can be seen from the foregoing description, the message waiting and do-not-disturb circuit of the present invention provides for automatic monitoring of these features at the operator console at any time that the operator becomes switched through to a line circuit and permits the operator to establish these features or remove these features in connection with that line circuit by merely pressing the appropriate button on the console. Thus, the need for dialing a special sequence of numbers or special digits is eliminated, thereby facilitating the establishment of a message waiting or do-not-disturb condition and the removal thereof. It is also of considerable advantage to provide a single button at the console for message waiting and a single button for do-not-disturb by which these conditions may be either established or removed depending upon the previously detected condition of the line circuit as stored in the individual line units. Thus, it is not necessary to provide one button for setting message wait and another button for resetting this condition and a further button for setting do-not-disturb with a companion button for resetting this condition. It is also noted that the monitoring, setting, and resetting of the message waiting and do-not-disturb conditions for a particular line circuit do not require actual communication between the operator and the party associated with the line circuit. Thus, the operator may monitor and effect the necessary operations in connection with these special features even though the line circuit is busy or the call to the line circuit is not answered by the party since the line number of the line circuit is automatically forwarded to and stored in the number display as soon as the operator is switched through to the line circuit. The use of the message waiting and do-not-disturb circuit by the ESC to automatically monitor calls to a line circuit from other than the operator during each timing cycle is also of considerable advantage.

What is claimed is:

1. In a private automatic branch exchange including a plurality of stations each having a line circuit associated therewith, at least one operator position circuit capable of being connected to said line circuits, a position store associated with said operator position circuit and common control means for storing in said position store the line number of a line circuit at the time it is connected to said position circuit, a message waiting and do-not-disturb circuit comprising line unit means including a plurality of line units for storing the message waiting and the do-not-disturb status of each line circuit, accessing means responsive to connection of said operator position circuit to a line circuit for reading-out the data stored in the line unit designated by the line number stored in said position store, and first indicator means responsive to the data read-out of said line unit by said accessing means for indicating the message waiting and the do-not-disturb status of said line circuit.

2. The combination defined in claim 1, wherein said exchange includes a plurality of operator position circuits, timing means for generating operator time slot signals sequentially enabling said operator position circuits and a plurality of position stores associated with said respective operator position circuits, said accessing means including selector gating means responsive to a monitor pulse generated in said position circuits upon connection thereof to a line circuit and an operator time slot signal for selectively reading-out the line number stored in the position store associated with the operator position circuit.

3. The combination defined in claim 2, wherein said accessing means further includes decoder means responsive to the line number supplied by said position stores via said selector gating means for enabling the corresponding line unit to read-out the data stored therein.

4. The combination defined in claim 2, wherein said exchange includes number display means for displaying the number of the line circuits connected to each operator position circuit, said position stores forming part of said number display means.

5. The combination defined in claim 2, wherein said exchange further includes a line number store and said common control means includes means for storing in said line number store the line number of a line circuit to which another station has requested connection, said line number store being connected to said selector gate means so as to provide the stored line number during one dedicated operator time slot to access the line unit corresponding to the stored line number and means for applying the do-not-disturb status derived from said accessed line unit during said dedicated operator time slot to said common control means.

6. The combination defined in claim 5, further including means responsive to said common control means during said one dedicated operator time slot for inhibiting said operator position circuits.

7. The combination defined in claim 2, wherein each line unit includes a first flip-flop for storing the message waiting status of the corresponding line circuit, a second flip-flop for storing the do-not-disturb status of the corresponding line circuit, and first and second gates having inputs connected to said first and second flip-flops, respectively, and outputs connected to a terminal common to all of said line units.

8. The combination defined in claim 7 wherein said timing means also generates a plurality of signaling time slot signals during each operator time slot signal, said first and second gates in each line unit being enabled by a signal from said accessing means and by different ones of said signaling time slot signals.

9. The combination defined in claim 8, wherein said line units each further include additional gating means connected to said first and second flip-flops and responsive to a signal from said accessing means and respective ones of said signaling time slot signals for setting and resetting said first and second flip-flops.

10. The combination defined in claim 9, wherein a plurality of third gates are connected to said common terminal of said line units and receive respective operator time slot signals, the outputs of said third gates representing the message waiting and do-not-disturb status stored in said respective line units.

11. The combination defined in claim 10, wherein each operator position circuit includes status storage means responsive to information in said line units for driving said first indicator means.

12. The combination defined in claim 2, further including second indicator means at each station connected to a respective line unit for indicating the message waiting and do-not-disturb condition stored therein.

13. The combination defined in claim 9, further including manually operable means for each operator position circuit to generate respective first and second status change signals, means responsive to the generation of a first or second status change signal for generating a monitor pulse in the operator position circuit to operate said selector gating means during the operator time slot signal of the particular operator position circuit, and comparing means responsive to generation of said first or said second status change signal for applying a selected signaling time slot signal to said line units depending on the information already present in the line unit accessed by said accessing means.

14. The combination defined in claim 13, wherein said comparing means includes a plurality of gates receiving on one input said first or said second status change signal, on another input the message waiting or do-not-disturb status stored in a particular line unit and on a third input a signaling time slot signal for effecting setting or resetting of the first or second flip-flop in the line unit.

* * * * *